(12) United States Patent
Cheng

(10) Patent No.: US 6,273,618 B1
(45) Date of Patent: Aug. 14, 2001

(54) OPTICAL FIBER CONNECTOR

(76) Inventor: Yu-Feng Cheng, No. 7 Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 0 days.

(21) Appl. No.: 09/294,783

(22) Filed: Apr. 19, 1999

(51) Int. Cl.[7] .................................................. G02B 6/38
(52) U.S. Cl. ............................. 385/56; 385/53; 385/55; 385/58; 385/66; 385/67; 385/70; 385/72; 385/84
(58) Field of Search ............................... 385/53, 56, 66, 385/70, 84, 55, 58, 67, 72

(56) References Cited

U.S. PATENT DOCUMENTS 4,134,641 * 1/1979 Kao et al. .............................. 350/96
5,717,800 * 2/1998 Funabashi .............................. 385/49

* cited by examiner

Primary Examiner—Cassandra Spyrou
Assistant Examiner—Craig Curtis
(74) Attorney, Agent, or Firm—Dellett and Walters

(57) ABSTRACT

An improved optical fiber connector includes a pair of female bodies, each having a first end and a second end, a cavity defined in the first end and a tubular portion extending from the second end, the tubular portion having a diameter smaller than that of the cavity; and a tube fixedly held between the tubular portions and connecting the female bodies.

2 Claims, 5 Drawing Sheets

OPTICAL FIBER CONNECTOR

FIELD OF THE INVENTION

The present invention relates to an optical fiber connector and, more particularly, to an optical fiber connector which enables correct, undegraded transmission of signals through filaments it connects and simplifies the injection mold required to be used.

BACKGROUND OF THE INVENTION

There are many optical fiber connectors for interconnecting the ends of filaments. FIGS. 4 and 5 show a conventional optical fiber connector (50) that comprises a female main body (52) having a pair of cavities (54, 56) adapted to receive male connectors (40, 42) and a longitudinal tubular portion (58) integrally formed therein. In that manner, signals may be transmitted from one filament (41, 43) to the other, once the male connectors (40, 42) are plugged into the cavities (54, 56) of the female connector (52) and the filament (41, 43) are inserted and coupled in the tubular portion (58).

However, the optical fiber connector (50) is complicated in structure, since it must be integrally formed with the tubular portion (58) as well as the cavities (54, 56), which makes the connector (50) easier to be made by injection molding, but makes the injection mold too complicated to be designed and fabricated.

It is more important that the integral injection molding will result in non-uniform contraction of the inner periphery of the tubular portion (58) in its size and shape as well. As a result, the filaments (41, 43) may be misaligned with each other even if the male connectors (40, 42) are plugged into the cavities (54, 56) of the main body (52), thereby resulting in the degradation of signals transmitted therethrough.

SUMMARY OF THE INVENTION

The object of the present invention is to provide an optical fiber connector which enables correct, undegraded transmission of signals through different filaments that connect.

Another object of the present invention is to provide an optical fiber connector which simplifies the injection mold used to fabricate such an optical fiber connector.

DETAILED DESCRIPTION OF PREFERRED EMBODIMENT

Figure 1:
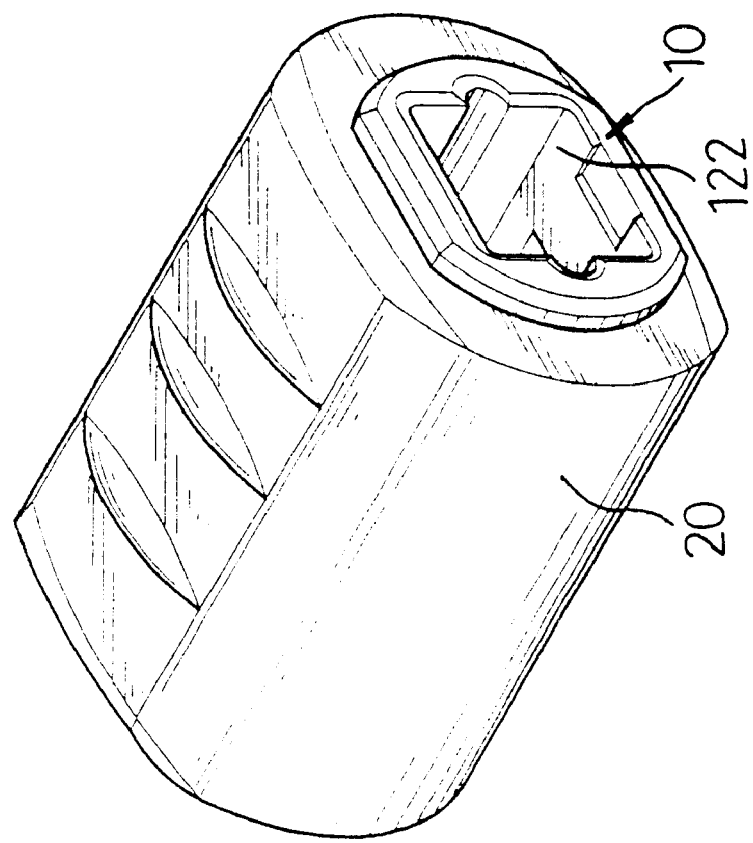
FIG. 1 is a perspective view of an optical fiber connector in accordance with the present invention.
Figure 2:
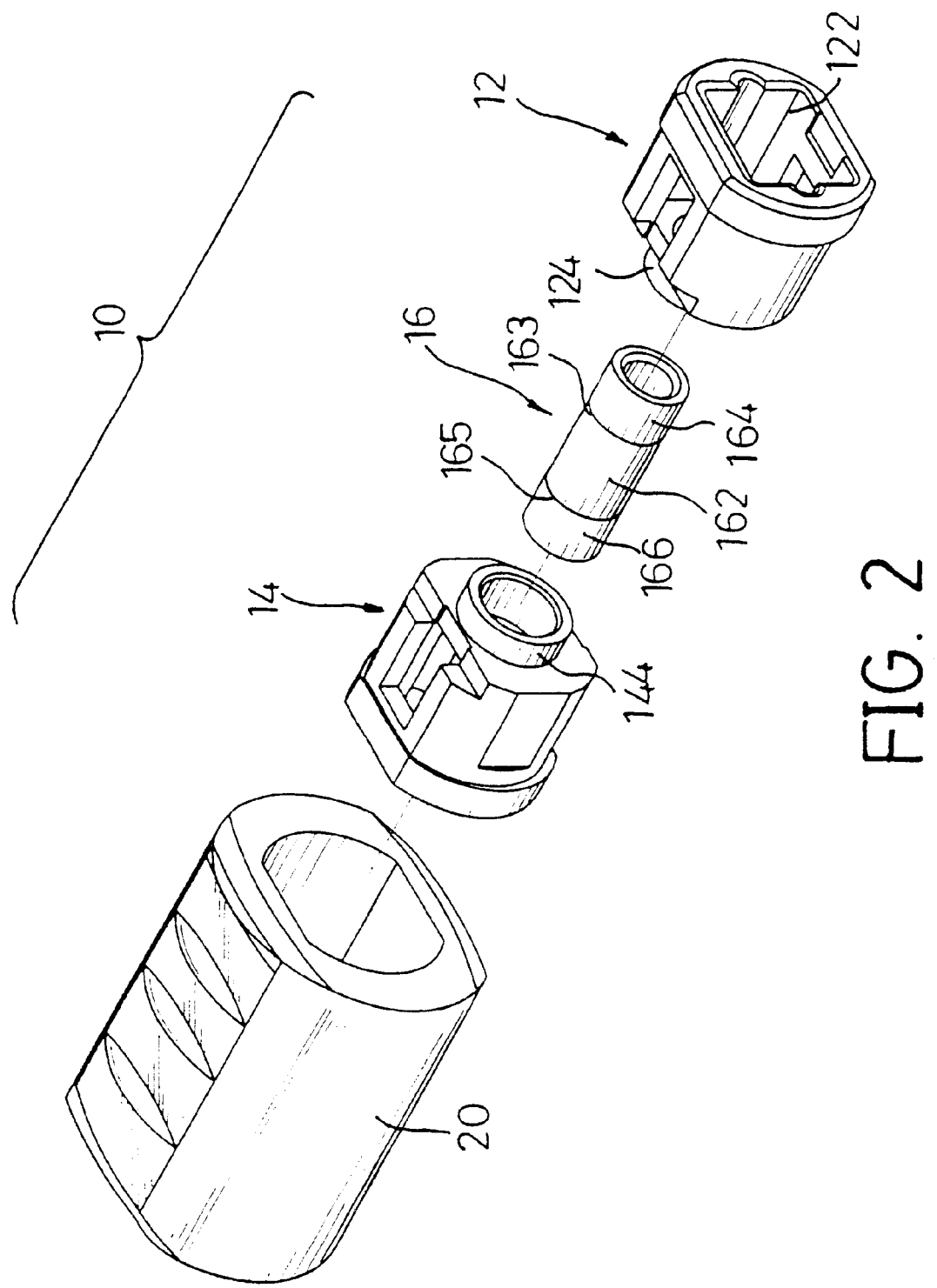
FIG. 2 is an exploded perspective view of the optical fiber connector shown in FIG. 1.

Referring to FIGS. 1 and 2, an improved optical fiber connector (10) in accordance with the present invention includes a pair of female bodies (12, 14), a tube (16) connecting the female bodies (12, 14), and a sheath (20) for shielding the connected female bodies (12, 14).

Figure 3:
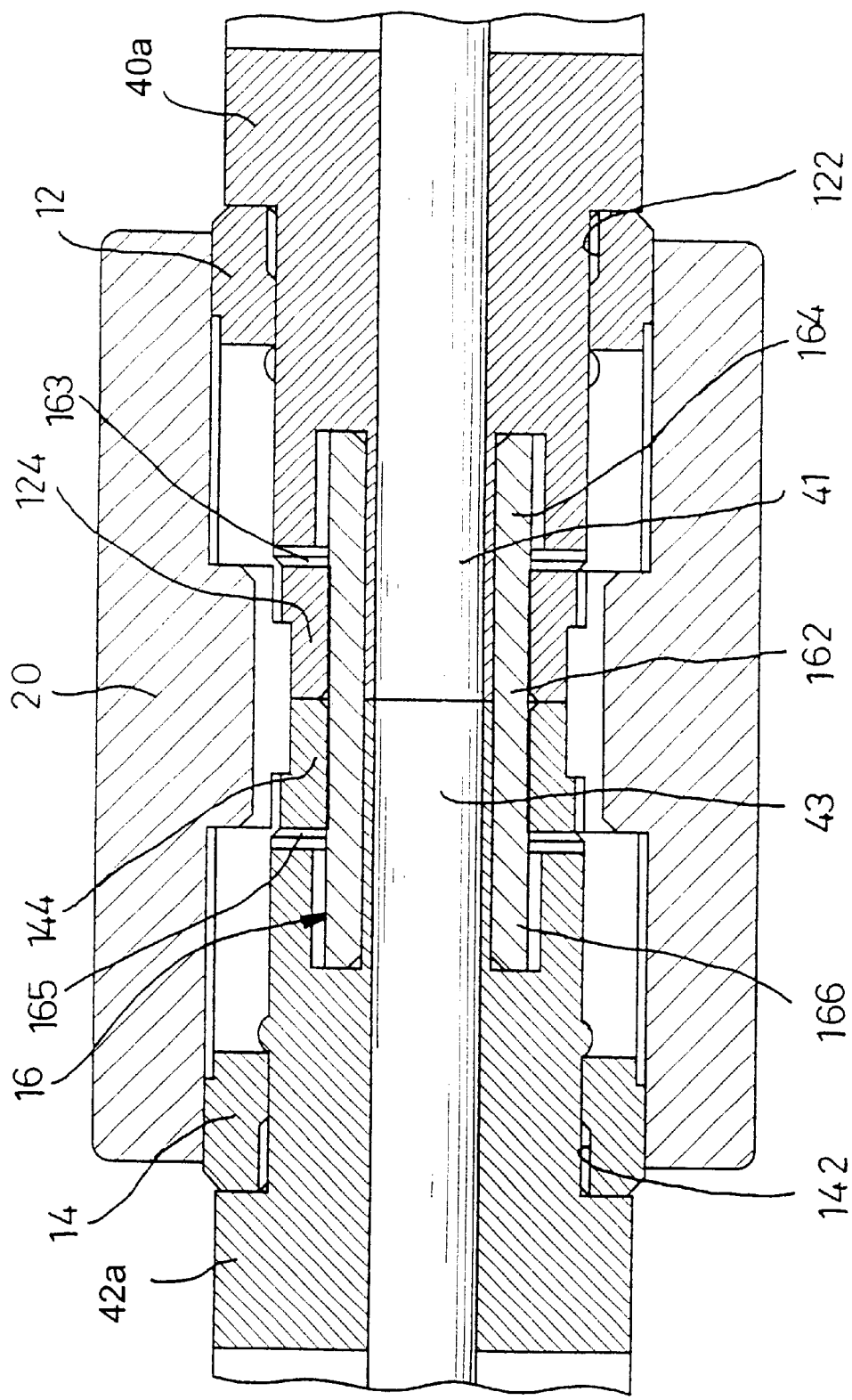
FIG. 3 is a side cross-sectional view showing the optical fiber connector of FIG. 1 connecting two filaments.
Figure 4:
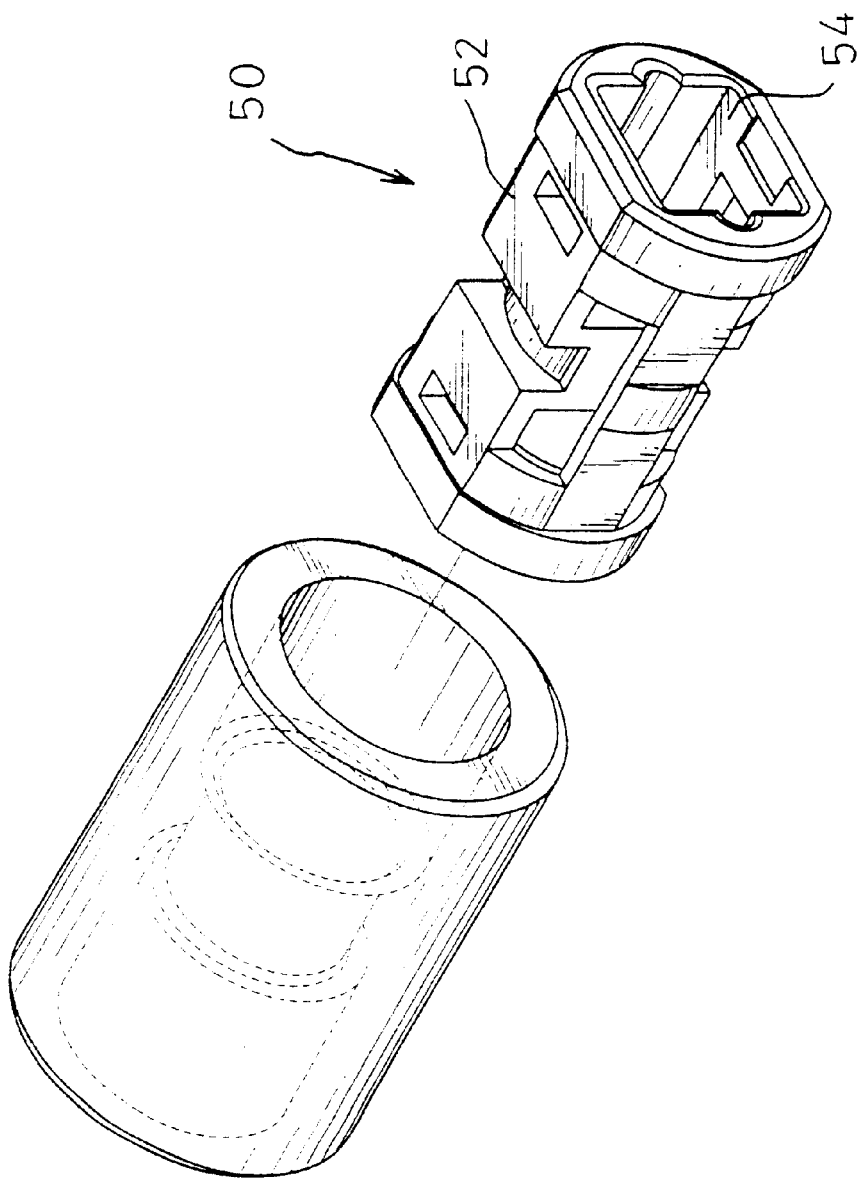
FIG. 4 is an exploded perspective view of a conventional optical fiber connector.
Figure 5:
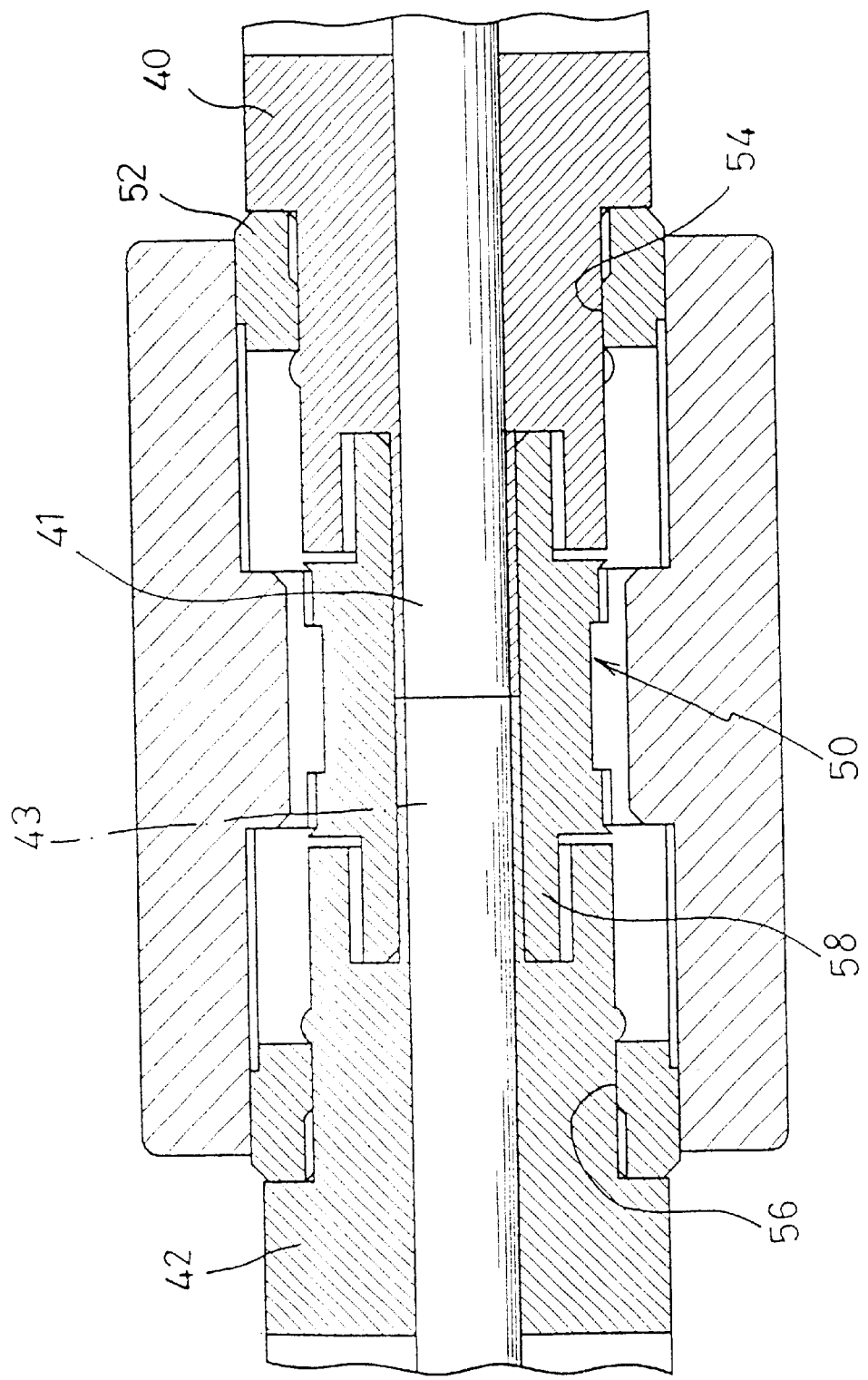
FIG. 5 is a cross-sectional view showing the conventional optical fiber connector of FIG. 4 interconnecting two filaments.

Referring to FIGS. 2 and 3, each of the female bodies (12, 14), preferably made of plastics so as to have sufficient resilience, have a cavity (122, 142) defined in a first end thereof to receive an optical fiber plug (40, 42), and a tubular portion (124, 144) extending from a second end thereof.

The tubular portion (124, 144) communicates with the cavity (122, 142) and has a diameter smaller than that of the cavity (122, 142), which forms a stepped structure therebetween, as shown in FIG. 3.

A tube (16), made of metal, includes a middle portion (162) with an outside diameter substantially the same as the inside diameter of the tubular portion (124, 144) of the female bodies (12, 14), and enlarged diameter ends (164, 166). A pair of shoulders (163, 165) are formed on the tube (16) at the junctions between the middle portion (162) and the enlarged ends (164, 166), respectively.

The optical fiber connector (10) is assembled by pressing the tube (16) into the tubular portions (124, 144) of the female bodies (12, 14), which are made of plastic to have sufficient resilience to insert the enlarged ends (164, 166) into the tubular portions (124, 144).

This procedure is continued till the middle portion (162) of the tube (16) is fully received in the two tubular portions (124, 144) and the enlarged ends (164, 166) of the tube (16) are received in the cavities (122, 142), with the shoulders (163, 165) of the tube (16) contacting the stepped structure formed in the cavities (122, 142) of the bodies (12, 14), thereby fixedly holding the tube (16) in the tubular portions (124, 144) and connecting the female bodies (12, 14).

The assembly of the optical fiber connector (10) is finished by securing the sheath (20) around the interconnected female bodies (12, 14), so as to prevent foreign matter, such as moisture and dust, from getting into the connector (10).

Referring specially to FIG. 3, when two optical fiber plugs (40a, 42b) are required to be coupled by means of the connector (10), the plugs (40a,42b) are plugged into the respective cavities (122, 142) of the female bodies (12, 14), with ends of the filaments (41, 43) extending into the tube (16) and abutting one other. Because the tube (16) is made of metal, there is no problem of non-uniform contraction in size or particularly in shape of the inner periphery of the tube (16) after injection molding, and the filaments (41, 43) received in the tube (16) are aligned with each other without any offset. This enables correct, non-degraded transmission of signals through the ends of the filaments (41, 43).

From the forgoing, it is apparent that the optical fiber connector (10) in accordance with present invention is advantageous to the fidelity of the signals transmitted through the filaments (41,43). In addition, the separate design of the identical female bodies (12,14) simplifies the mold required to fabricate the optical fiber connector (10) in accordance with the present invention, and thus reduces the cost thereof.

What is claimed is:

1. An improved optical fiber connector, comprising:
   a pair of female bodies each having a first end and a second end, a cavity defined in said first end and a tubular portion extending from said second end, said tubular portion having a diameter smaller than that of said cavity, and a stepped structure formed at a junction between said cavity and said tubular portion; and
   a tube fixedly held between said tubular portions and connecting said female bodies, said tube comprising a middle portion having an outer diameter substantially the same as the diameter of said tubular portion, opposite enlarged ends and a shoulder formed at the junctions between said middle portion and said enlarged ends, wherein said middle portion of said tube is dimensioned so that said shoulders abut said stepped structure after said tube is inserted into said tubular portions of said female bodies.

2. The improved optical fiber connector as claimed in claim 1 further including a sheath for shielding said interconnected female bodies.